Patented July 5, 1938

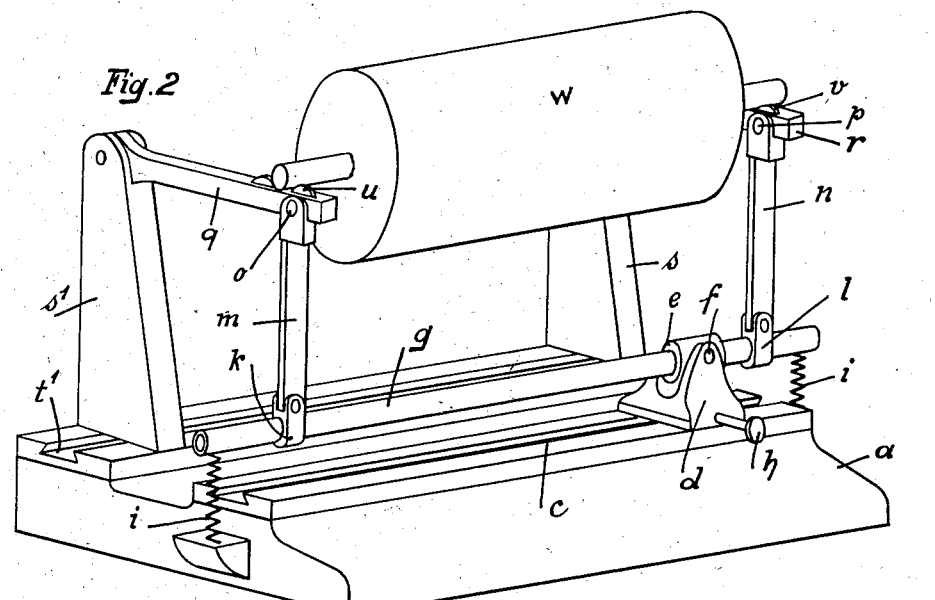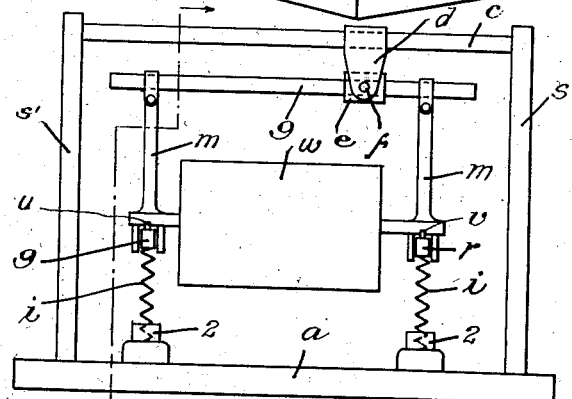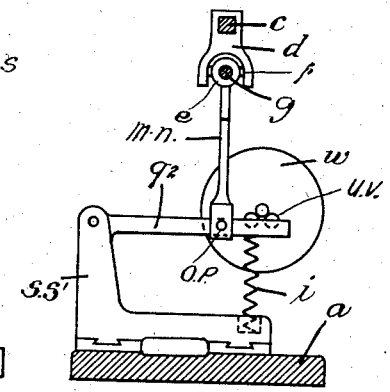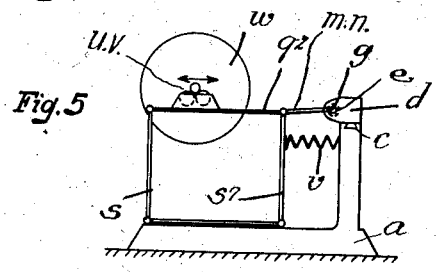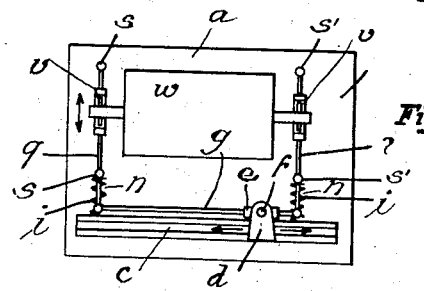

2,122,621

UNITED STATES PATENT OFFICE 2,122,621

BALANCING MACHINE WITH ROCKING AXIS ADJUSTABLE AT WILL

Carl Ohly, Darmstadt, Germany

Application January 8, 1936, Serial No. 58,212
In Germany January 16, 1935

8 Claims. (Cl. 73—51)

Balancing machines are known with which the rocking axis, around which the body to be balanced pivots for the purpose of the ascertainment of the errors in balance, may be adjusted to desired positions in relation to the body balanced. With the known machines of this description the body balanced is mounted on a frame-like or similarly constructed body and the said body rests in bearings which render possible a rocking of the entire device round a rocking axis. The displacement of this rocking axis in relation to the balanced body is effected, either by its bearings being displaced along the frame, or by the body which is balanced being itself displaced or shifted in the frame.

The arrangement described is therefore not suitable for all cases, because the frame or the body which takes its place either forms an obstruction to the putting on of large bodies for balancing, especially those which are of an unfavourable shape for the balancing device, or else the said frame of body must be of extremely large dimensions. In all cases, and especially in the last named, the mass of the frame which participates in the rocking is relatively large and therefore unfavourably influences the sensitiveness and the recording accuracy of the machine.

On the other hand it is known to provide balancing machines with a pivotally mounted auxiliary rod lying parallel to the weighing body and articulatedly connected with it, to which rod the disturbing forces are transferred from the body which is balanced. With these balancing machines it has not however previously been possible to displace the rocking axis in relation to the test body.

In accordance with the invention this disadvantage is overcome in the last named balancing machines by a rocking axis for the auxiliary rod being displaceably arranged along the auxiliary rod, so that in the case of rocking of the system consisting of test body, connecting rod gear and auxiliary rod, the position of the rocking axis of the auxiliary rod compulsorily fixes the position of the rocking axis for the body which is balanced. The auxiliary rod can be arranged in the known manner over, under, or by the side of the body which is balanced. An advantageous embodiment of the idea of the invention is achieved by the arrangement of the auxiliary rod vertically under the body which is balanced, so that the load of the body balanced is transferred by means of the link supports to the auxiliary rod which is directly connected with the spring supports of the rocking system. On the auxiliary rod there is conveniently fitted, as well as the arrangement of the rocking axis, a compensating device which is conveniently displaceable along the rod and which acts against the errors in balance. This arrangement of the compensating device on an auxiliary rod is known with balancing machines with rocking frames, therefore without articulated connection between the auxiliary rod and the body which is balanced.

In the accompanying drawings, Figure 1 is a perspective view illustrating an embodiment of the invention.

Figure 2 is a perspective view illustrating an alternative embodiment thereof.

Figure 3 is a front elevation of a further alternative embodiment of the apparatus comprising the invention.

Figure 4 is substantially a side elevation from one end of Figure 3 as indicated by the arrows.

Figure 5 is an end elevation of a further alternative embodiment of the invention.

Figure 6 is a top plan view of the embodiment illustrated in Figure 5.

Figure 1:
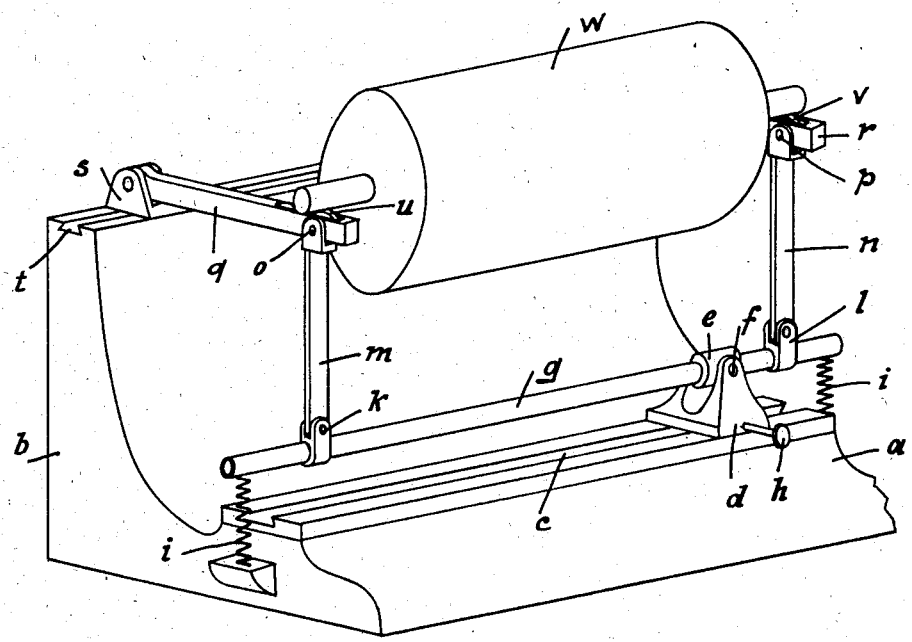

One example of application of the idea of the invention is diagrammatically depicted in Figure 1 of the drawings. The balancing machine consists of a base $a$ with a rear wall $b$. On the slide $c$ of the base is a displaceable saddle bearing $d$. In the saddle $d$ is a bearing $e$ rotatably mounted on the axis $f$ in such a manner that it can pivot on a horizontal axis lying perpendicular to the slide. A tubular rod $g$ is mounted in the bearing $e$ so that it is rotatable on the axis of the said bearing. If the saddle $d$ be displaced along the slide, for instance by actuation of the handwheel $h$, while the tubular rod $g$ retains its position, the axis of rotation is thus displaced in relation to the tubular rod. Springs $i$ of any desired description, which rest upon the base and upon which the tubular rod $g$ supports itself at either end, make the device a system capable of rocking.

On the tubular rod $g$ are forked sliding pieces $k$ and $l$ which are displaceable on the tubular rod and rotatably connected with supporting links $m$ and $n$. These supports are in turn fork-shaped at their upper end and in their axes of rotation $o$ and $p$ are mounted the two guide levers $q$ and $r$. The other end of these two levers is also rotatable, being mounted in sliding members $s$ one of which is not visible in the drawings. These sliding members are displaceable on a slide $t$ of the rear wall. The guide levers $q$ and $r$ carry rollers u and v, in which the shaft of the body w which is to be balanced is mounted.

The tubular rod g pivots, as already mentioned, on the axis of rotation f which is displaceable along the said tubular rod. By means of the arrangement of the tubular rod, the supports, and the body balanced, in the manner of an articulated rectangle, the body which is balanced does not rotate on the same axis f as the tubular rod g, but on an axis which lies vertically over the axis f and passes through the axis of rotation of the body balanced. By means of this, despite the fact that the auxiliary rod g can be arranged at any desired distance from the body balanced, the same result is attained as with the mounting of the body balanced directly in a frame, the axis of pivoting of which is actually perpendicular to the axis of rotation of the body which is balanced, as is the case with the known arrangements. It is only necessary for this that the supports m and n should be guided parallel to one another and therefore that, in the example depicted, should rock substantially vertically only. This manner of rocking is secured in the example depicted by the supports m and n being attached in their upper part to the guides q, so that here they execute a pivoting in the form of an arc, which however with the usual slight movements may for practical purposes be regarded as a straight line. On the lower part of the supports m and n the tubular rod g acts in the same manner as a guide.

It is not necessary that the auxiliary rod should lie perpendicular under the body which is balanced; it can also be arranged above the said body in the manner shown in Figures 3 and 4. The supports must in this case be constituted as pulling members and guided in a similar manner as in the example depicted. The auxiliary rod can however also be arranged at the side of the body which is balanced as shown in Figures 5 and 6. This arrangement has the advantage that the weight of the body to be balanced is not transferred to the auxiliary rod. The body which is balanced is in this case to be mounted in such a manner that it can freely move laterally. If it be rotated, whereby the errors in balance produce rocking, then this rocking is transferred by lateral rod-gears after the manner of the supports, in the example depicted, to the auxiliary rod, the axis of pivoting f of which must in this case lie vertically. In the same way it naturally follows that the springing of the auxiliary rod must be arranged horizontally as opposed to the vertical arrangement in the example first depicted. In other respects the factors in such cases are the same as described, i. e., balancing body, transmission rod gear and auxiliary rod must form an articulated rectangle.

The auxiliary rod, which is described in the above mentioned examples as a tubular rod, can be constituted in any other manner desired. For example, a solid rod can be employed. If greater stability is desired, any other kind of section iron can be employed. It is also possible to arrange several such parts above or below one another. The same applies for the rod gear, which transfers the movements from the body balanced, to the auxiliary rod. This rod gear can also directly take the mounting for the body which is balanced, in place of the horizontal guides.

For the measurement of the error in balance, any of the procedures applicable with the known machines may be employed with the machines constructed according to the invention. The present invention is, inter alia, specially well suited for measuring processes with the assistance of supplementary centrifugal forces. A suitable device can, for example, be fitted without difficulty on the tubular rod g and arranged so that it is displaceable. It is thus possible to adjust such a device into each desired plane of section of the test body.

The fundamental idea of the invention is to provide a rod which can be made oscillatory by means of an oscillating axis and which is connected to the body to be balanced in such a way that thereby is also engendered a pivoting axis for the said body which traverses the latter perpendicularly.

The guiding of the support can also be effected in another manner as shown in Figure 2. For example, the guides q and r can be arranged, either one or both of them, in the direction of the axis of rotation of the body which is balanced. In this case also they lie perpendicular to the supports m and n, so that when rocking ensues there results in this case also a path approximating a straight line. With this manner of construction the rear wall b can be dispensed with and the machine is therefore more capable of employment with balancing bodies having a very great diameter. This result, however, may be obtained with the first example of the invention, as far as the great majority of cases which arise in practice are concerned, by hollowing out the rear wall in the middle.

I claim:

1. In a balancing machine, a base having a wall along one edge thereof, there being slideways formed in said base and wall, a slide arranged in the base slideway, a rod pivotally and slidably associated with said slide to permit rocking movement of the rod at any point of adjustment of the slide, spring means interposed between the base and the end portions of the said rod, a pair of slides in the wall slideway, and members pivoted to each of the last mentioned slides and extending outwardly over the rod, a supporting element pivotally connected at one end to the other portion of each of said members and at its opposite end being slidably and pivotally connected to said rod, said members being provided with means for receiving a body to be tested.

2. The structure of claim 1, and rollers carried by said members.

3. In a balancing machine, a base, a pair of members pivoted thereto and arranged to mount a body to be tested, an auxiliary rod mounted on said base directly below the axis of said body for rocking movement, and a supporting link articulatedly connecting each of said members with an end portion of said rod.

4. In a balancing machine, a base, a pair of spaced members pivoted thereto and arranged to mount a body to be tested, an auxiliary rod, a bearing slidably and rockably supporting said rod and adjustable axially thereof on the base, and a supporting link articulatedly connecting each of said members with an end portion of said rod.

5. In a balancing machine, a base, a pair of spaced members pivoted thereto and arranged to mount a body to be tested, a rod mounted directly below the axis of said body on said base for oscillation thereon, and an articulated connection between each of said members and the rod.

6. In a balancing machine, a base, pivoted members mounted on said base for supporting a body to be tested, a rod carried by said base, said rod being rockably mounted on a slidable bearing member mounted on the base, supporting link members connecting the pivoted members and the ends of the rod, and springs connected at the ends of the said rod to said base.

7. In a balancing machine, a base, a pair of members pivoted on said base and spaced apart for supporting therebetween the opposite ends of a body to be balanced, an auxiliary rod, supporting links articulatedly connecting said rod with each of said members, and a rod bearing member on said base displaceable longitudinally along said rod and base providing a pivoting axis therefor whereby the body may swing around any desired axis dependent upon displacement of said bearing.

8. In a balancing machine, a base, a pair of spaced apart pivoted members adapted to support the opposite ends of a body to be balanced, an auxiliary rod disposed in spaced relation to said members and with its major axis substantially parallel to the major axis of the body to be balanced, a supporting link between each said member and an end portion of said rod, said supporting link members having an articulated connection respectively with each said pivoted member and the rod, and a rod fulcrum bearing member adjustable on said base longitudinally of said rod, said fulcrumed bearing member having a bearing pivotally and slidably connected with said rod whereby to provide an adjustable axis of rotation therefor to determine the axis of rotation of the body to be balanced.

CARL OHLY.